US010941522B1

(12) United States Patent
Buist et al.

(10) Patent No.: US 10,941,522 B1
(45) Date of Patent: Mar. 9, 2021

(54) REAL TIME REGULATION OF YANKEE DRYER COATING BASED ON PREDICTED NATURAL COATING TRANSFER

(71) Applicant: Buckman Laboratories International, Inc., Memphis, TN (US)

(72) Inventors: David Buist, Matawan, NJ (US); Vincent Roy, Memphis, TN (US); Colin Ruemmele, Memphis, TN (US); Daniel Glover, Memphis, TN (US); Richard Lusk, Memphis, TN (US); Philip Hoekstra, Memphis, TN (US)

(73) Assignee: Buckman Laboratories International, Inc., Memphis, TN (US)

( * ) Notice: Subject to any disclaimer, the term of this patent is extended or adjusted under 35 U.S.C. 154(b) by 0 days.

(21) Appl. No.: 16/106,194

(22) Filed: Aug. 21, 2018

Related U.S. Application Data

(62) Division of application No. 15/655,545, filed on Jul. 20, 2017.

(51) Int. Cl.
*G06N 5/04* (2006.01)
*G07C 5/08* (2006.01)
(Continued)

(52) U.S. Cl.
CPC .......... *D21G 9/0036* (2013.01); *B05D 1/002* (2013.01); *B05D 1/40* (2013.01)

(58) Field of Classification Search
CPC .................................................. D21G 9/0036
See application file for complete search history.

(56) References Cited

U.S. PATENT DOCUMENTS 7,803,899 B2 9/2010 Zollinger et al.
8,308,900 B2 11/2012 Covarrubias et al.
(Continued)

FOREIGN PATENT DOCUMENTS

WO 199306300 A1 9/1992

OTHER PUBLICATIONS

European Patent Office: International Search Report for PCT/IB2018/055377, dated Oct. 1, 2018, 11 pp.
(Continued)

*Primary Examiner* — Dah-Wei D. Yuan
*Assistant Examiner* — Kristen A Dagenais-Englehart
(74) *Attorney, Agent, or Firm* — Patterson Intellectual Property Law, P.C.; Scott M. Douglass; Gary L. Montle

(57) ABSTRACT

A method is provided for decision support in regulating an adhesive coating applied to Yankee dryers. Online sensors are configured to continuously measure stock characteristics, and additional sensors provide actual stock flow rate and machine speed. A controller predicts potential natural coating application from a fibrous sheet generated from the stock to the Yankee dryer surface, substantially in real time, based on the measured characteristics and sensed actual machine values. An output signal may be provided to a display unit, wherein an optimal adhesive coating feed rate may be determined and displayed for operator decision support. The controller may in an automatic mode be configured to regulate the adhesive coating feed rate based on a comparison of one or more determined optimal values associated with respective actual values. The method may include identifying fiber source changes in real time, and predicting a natural coating potential based partly on predetermined correlations.

14 Claims, 4 Drawing Sheets

(51) Int. Cl.

| | |
|---|---|
| ***D21G 9/00*** | (2006.01) |
| ***B05D 1/00*** | (2006.01) |
| ***B05D 1/40*** | (2006.01) |

(56) References Cited

U.S. PATENT DOCUMENTS

| | | | | |
|---|---|---|---|---|
| 8,568,562 | B2 | 10/2013 | Sullivan et al. | |
| 2002/0060017 | A1* | 5/2002 | Kuusisto | D21G 9/0027 162/198 |
| 2002/0148584 | A1* | 10/2002 | Edwards | D21F 5/182 162/204 |
| 2003/0042195 | A1* | 3/2003 | Forde-Kohler | B01D 39/00 210/488 |
| 2007/0204966 | A1 | 9/2007 | Chou et al. | |
| 2010/0086672 | A1 | 4/2010 | Von Drasek et al. | |
| 2010/0269996 | A1* | 10/2010 | Grattan | C02F 1/008 162/198 |
| 2011/0297341 | A1 | 12/2011 | Dilkus | |
| 2012/0211190 | A1 | 8/2012 | Goto et al. | |
| 2013/0048238 | A1 | 2/2013 | Glover et al. | |
| 2013/0180677 | A1 | 7/2013 | Thomas et al. | |
| 2013/0245158 | A1 | 9/2013 | Grigoriev et al. | |
| 2014/0096925 | A1 | 4/2014 | Gordon | |
| 2014/0110071 | A1 | 4/2014 | Furman et al. | |
| 2015/0053358 | A1 | 2/2015 | Ban et al. | |
| 2015/0159329 | A1 | 6/2015 | Tan et al. | |
| 2016/0032527 | A1* | 2/2016 | Gorden | D21F 5/181 162/100 |

OTHER PUBLICATIONS

European Patent Office: International Search Report for PCT/IB2018/055377, dated Jan. 10, 2019, 11 pp.

Rezaei-Arjomand, F., et al., The Investigation of Adhesion of Resins Used as Tissue Creping Adhesives for a Yankee Dryer Surface Coating, J. Agr. Sci. Tech. (2013) vol. 15: 793-799.

Boudreau, Jonna, New methods for evaluation of tissue creping and the importance of coating paper and adhesion, Faculty of Health, Science and Technology, Chemical Engineering, Dissertation, Karlstad University Studies, 2013:47.

* cited by examiner

REAL TIME REGULATION OF YANKEE DRYER COATING BASED ON PREDICTED NATURAL COATING TRANSFER

CROSS-REFERENCES TO RELATED APPLICATIONS

This application is a divisional of the following patent application which is hereby incorporated by reference: U.S. patent application Ser. No. 15/655,545 filed Jul. 20, 2017, entitled "Real Time Regulation of Yankee Dryer Coating Based on Predicted Natural Coating Transfer."

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to the manufacture of creped products such as, e.g., bath tissue, paper towels, napkins, etc. More particularly, the present invention relates to systems and methods for predicting natural coating transfer in real time via continuous online data monitoring, and enabling real time control of the manufacturing process based thereon.

Conventional processes for the manufacture of creped products such as bath tissue, paper towels and napkins are well-established and require little elaboration herein. Generally stated, a continuous wet fibrous sheet is generated from a pulp stock having characteristics defined in part by the particular combination of one or more constituent fiber sources, and further in view of chemical additives, water source and the like. A heated rotary drying cylinder (herein referred to as a "Yankee dryer") is configured to pick up the wet sheet, to substantially dry the sheet, and then crepe the sheet in combination with a creping doctor blade associated therewith. This creping process imparts a three-dimensional structure to the sheet that is responsible, e.g., for the soft feel of tissue products. Creped products can be made using (but not limited to) light dry crepe machines, wet crepe machines, as well as through air drying (TAD) and other machines that may impart a structure to the sheet prior to the Yankee dryer.

The creping process, and more particularly the surface conditions on the Yankee dryer, are critical factors in the overall manufacturing process. For the sheet to attach to the Yankee surface there must be a thin adhesive coating present. This adhesive coating will in fact aid in the pickup of the sheet. The strength of the adhesive force between the Yankee surface and the sheet is very important factor in tissue manufacture. The force must be strong enough to hold the sheet in place, but weak enough to release the sheet at the proper point. Specifically designed chemical formulations are applied to the Yankee surface to provide the necessary adhesion and release properties of the surface. The pulp stock that provides the material that forms the web fibrous sheet also includes substances that will stick to the Yankee surface and provide an adhesive force. In this industry the term "natural coating" is used for this material that naturally comes from the stock and coats the surface of the Yankee. The composition of the pulp stock changes as the fiber sources or additives in that stock change, or as the characteristics of the water change. This variation requires adjustment in the amount of the chemical formulations that are used to control the adhesion and release properties of the Yankee surface. The "natural coating" plus the chemical additive together provide the total adhesive force.

Conventional techniques for adjusting the adhesive coating feed rate to achieve proper characteristics on the Yankee dryer are labor- and time-intensive, and further rely on assumptions regarding machine operation. As one example of a known process flow, the user is prompted to adjust the coating feed rate based on a fiber source (furnish) change, such as for example in view of a change in tissue grade. A mill employee or chemical supplier sales representative may, perhaps within minutes of the furnish change, obtain and begin testing of a sample to determine characteristics such as the total suspended solids (TSS) therein. This process is not online and therefore is not instantaneous or otherwise conducted in real time. The user can then inspect the set points for stock flow and machine speed, via for example a machine control system, for the given creped product grade and calculate the natural coating potential using a predetermined equation. However, this requires the assumption that the machine is operating at the stated set points.

Understanding and monitoring the amount of natural coating is an important part of improving Yankee adhesive performance which leads to better production of creped products. It would therefore be desirable to measure relevant online process characteristics and subsequently predict the amount of natural coating available to transfer to the coating, substantially in real time or at any given selected time. However, the inherently dynamic nature of the creped product manufacturing process has traditionally made such predictive analysis and corrections extremely difficult and impractical.

BRIEF SUMMARY OF THE INVENTION

It has been known in the industry that fiber sources with excessive fines tend to have an affinity to the Yankee dryer surface. Recycled fiber sources such as Mixed Office Waste (MOW), for example, have more fines and anionic trash such as ash than other fiber sources such as virgin *eucalyptus*. Also conventionally known in the industry was that these recycled furnishes tended to "deposit" more material on the surface of the Yankee dryer. However, there are no commonly understood or otherwise conventional techniques in the industry for predicting how much these fines, trash and ash would adhere to the Yankee dryer surface.

In accordance with systems and methods as disclosed herein, predictive algorithms are developed pursuant to close monitoring of machine conditions on the wet end, wherein cause and effect relationships and correlations are constructed. The correlations and algorithms may in certain embodiments be dynamic over time as additional information is provided, such as in the context of machine learning. Online measurements are continuously collected with respect to wet end conditions for a creped product manufacturing process, and the system implements the developed algorithms and the real time measurements to instantly notice changes in the characteristics of the stock and account for or report that information, making appropriate adjustments for current machine speed and stock flow values rather than relying on the respective set points. The system accordingly is configured to predict the amount of natural coating that could or would transfer to the Yankee dryer surface, substantially in real time.

Accordingly, a system and method as disclosed herein employs online measurement devices combined with software and hardware as needed to measure and monitor characteristics associated with predicted natural coating transfer, wherein the process may be regulated in real time.

In one aspect, a system and method as disclosed herein enables real time display, trending and remote access to relevant data. This data may provide decision support for a creped product manufacturer regarding the required amount of adhesive coating to be applied to the Yankee dryer surface based on the amount of natural coating present in the furnish.

In addition to providing decision support in the form of monitoring, trending and anticipation of potential corrective action, in another aspect a system and method as disclosed herein may determine and recommend an optimal value for machine operating parameters such as for example an adhesive coating feed rate, wherein the operator may for example provide corrective action based at least in part on the system recommendations.

In another aspect, a system and method as disclosed herein may include an automatic corrective mode wherein a forward (open loop) control operation is enabled to identify and automatically implement a corrective action for one or more machine operating parameters, via regulation of the associated working implements, e.g., pumps in an adhesive coating application device. The control operation may be proportional in nature, wherein the controller identifies a directional aspect of the desired correction in order to obtain an optimal adhesive coating based on at least the predicted natural coating transfer, and the control operation may in certain embodiments further include an integral and/or derivative aspect wherein the corrective steps account for a rate of change over time to substantially prevent overshooting.

In another aspect, a system and method as disclosed herein may include online measurement devices for sensing actual adhesive coating characteristics with respect to the Yankee dryer surface, wherein a feedback (closed loop) control may further be implemented to account for, e.g., coating thickness, uniformity and the like.

In yet another aspect, a system and method as disclosed herein continuously collects real time data regarding at least conductivity, turbidity, and pH.

DETAILED DESCRIPTION OF THE INVENTION

Figure 1:
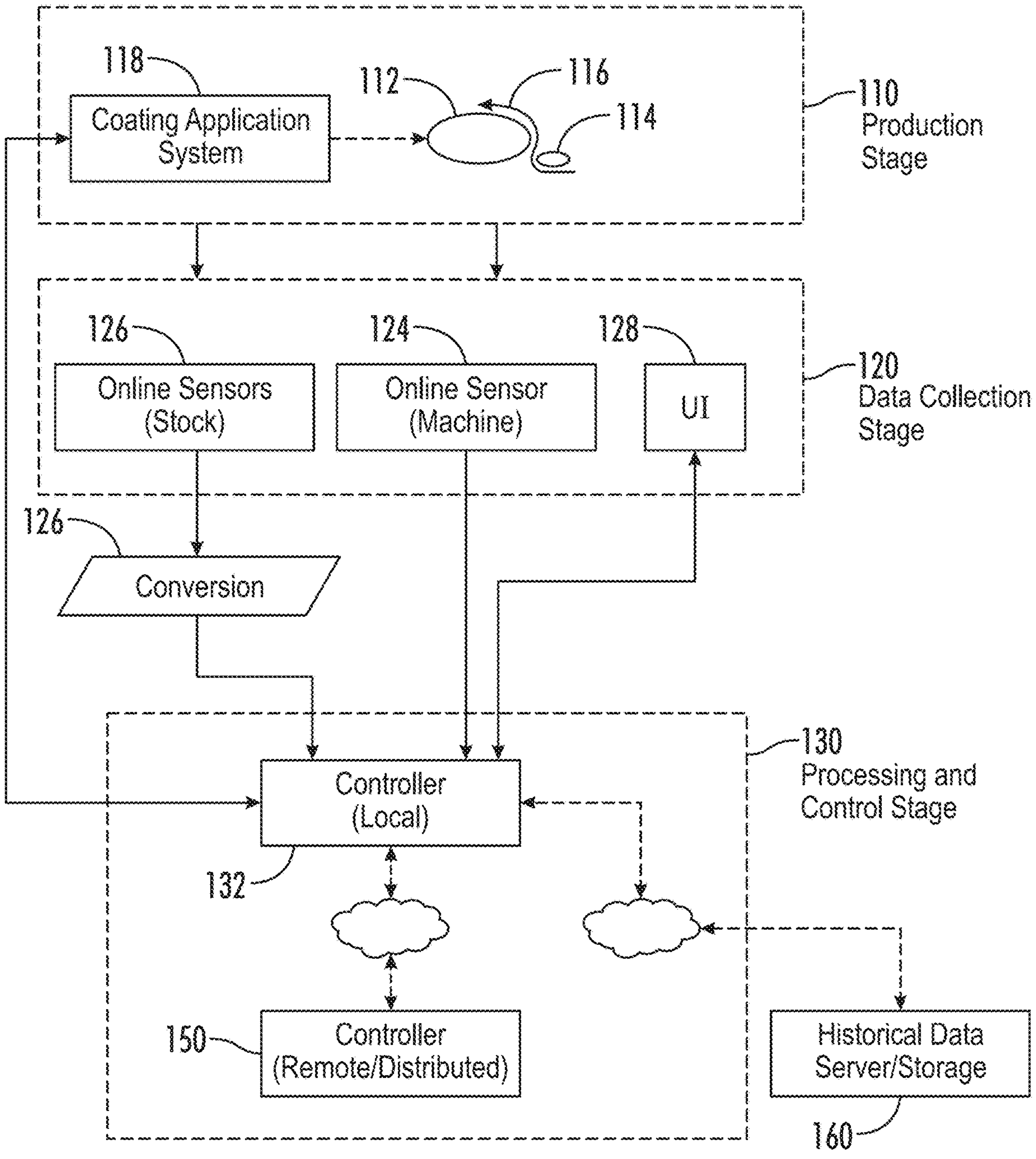
FIG. 1 is a block diagram representing an embodiment of a system as disclosed herein.

Referring generally to FIGS. 1-5, various exemplary embodiments of an invention may now be described in detail. Where the various figures may describe embodiments sharing various common elements and features with other embodiments, similar elements and features are given the same reference numerals and redundant description thereof may be omitted below.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "creped product" as used herein may generally refer to a fibrous sheet material, which may include additional materials. Associated fibers may be synthetic, natural or combinations thereof. The "creped product manufacturing process" as referred to herein may generally include at least the formation of an aqueous slurry comprising the associated fibers, dewatering the slurry to form a continuous fibrous sheet, applying the sheet to the Yankee dryer surface for the purpose of drying the fibrous sheet, and regulating a quantity and quality of adhesive and release aids applied to the surface of the Yankee dryer.

Referring first to FIG. 1, an embodiment of a Yankee dryer adhesion control system 100 as disclosed herein may be provided with respect to a creped product manufacturing system and process.

A creped product production stage 110 as represented in FIG. 1 is substantially as conventionally known, and detailed description is unnecessary here for those of skill in the art. A Yankee dryer 112 is configured in proximal association with one or more pressure rolls 114 to direct the continuous wet fibrous sheet 116 across the surface of the Yankee dryer 112 and remove as much water as possible from the sheet. A creping blade and a reel (not shown) may further be configured to engage the sheet 116, such as on an opposing end of the Yankee dryer 112 with respect to the pressure roll.

A coating application system 118 is provided to project a synthetic adhesive coating across the surface of the dryer. The adhesive coating may include any of various components and combinations thereof, as are well known in the art, but may generally be characterized as including at least an adhesive aid portion for causing the sheet to properly adhere to the surface of the Yankee dryer, and a release aid portion for causing the sheet to properly release from the surface of the Yankee dryer upon engagement by the creping blade. The coating application system 118 may generally include one or more chemical additives provided in determined relative quantities into a mixing tank, and fed from the tank to an array of spray nozzles transversely oriented with respect to a diameter of the Yankee dryer, and substantially across a width of the Yankee dryer so as to preferably provide a relatively uniform coating. In an embodiment, the adhesive aid portion and the release aid portion may preferably be mixed together prior to application in a Yankee dryer coating as referred to herein, but in an alternative embodiment various constituent components of the overall adhesive coating may be independently sprayed onto the Yankee dryer surface. An initial target flow rate of the adhesive coating may be determined based on various variables including, but not necessarily limited to, a nozzle spacing, distance of the nozzles from the Yankee dryer surface, spray angle, and the like.

As previously noted, a Yankee dryer adhesion control system as disclosed may preferably be configured to predictively measure and analyze a natural coating associated with the stock/fibrous sheet to determine the direct influence in real time of wet end chemistries and the furnish type with its level of refining, water hardness, level of ash, etc. This natural coating will impact Yankee dryer coating characteristics such as hardness, and thus the level of protection of the Yankee dryer. For example, one of skill in the art may appreciate that when the Yankee dryer coating gets too hard, this can lead to a phenomenon referred to as "stick and slip," which can result in chatter events. Therefore, one object of a system and method as disclosed herein may be to provide online information to proactively manage the level of adhesive and ensure that the creping blade rides in the synthetic coating (and not on the Yankee metal surface). An exemplary and non-limiting list of benefits of the online natural coating include: chatter prevention; better creping blade life and reduction of creping blade wear; optimal sheet transfer and quality; softness of the end product; felt filling prevention; and crepe efficiency (reel speed).

An embodiment of a data collection stage 120 is accordingly added into the system 100 to provide the real time measurements referred to above. One or more online sensors 122 are configured to provide substantially continuous measurements with respect to characteristics of the stock/fibrous sheet. Online sensors are well known in the art for the purpose of sensing or calculating characteristics such as turbidity, conductivity, pH and the like, and exemplary such sensors are considered as being fully compatible with the scope of a system and method as disclosed herein. The term "online" as used herein may generally refer to the use of a sensor or sensor elements proximally located to the machine or associated process elements and generating output signals in real time corresponding to the desired operating characteristics, as distinguished from manual or automated sample collection and "offline" analysis in a laboratory or through visual observation by one or more operators.

Individual sensors may be separately implemented for the respective measurements to be collected, or in some embodiments one or more individual sensors may provide respective outputs that are implemented for the calculation of multiple variables. Individual sensors may be separately mounted and configured, or the system may provide a modular housing which includes a plurality of sensors or sensing elements. Sensors or sensor elements may be mounted permanently or portably in a particular location respective to the machine operation, or may be dynamically adjustable in position so as to collect data from a plurality of locations during the machine operation.

One or more additional online sensors 124 are configured to provide substantially continuous measurements with respect to machine operating parameters. A user interface 128 is further provided and configured to enable operator input regarding additional parameters and/or coefficients as further described below. The term "user interface" as used herein may unless otherwise stated include any input-output module with respect to the controller and/or the hosted data server including but not limited to: a stationary operator panel with keyed data entry, touch screen, buttons, dials or the like; web portals, such as individual web pages or those collectively defining a hosted website; mobile device applications, and the like.

The term "continuous" as used herein, at least with respect to the disclosed measurements, does not require an explicit degree of continuity, but rather may generally describe a series of online measurements corresponding to physical and technological capabilities of the sensors, the physical and technological capabilities of the transmission media, the physical and technological capabilities of the controller and/or interface configured to receive the sensor output signals, and/or the requirements of the associated control loop(s). For example, measurements may be taken and provided periodically and at a rate slower than the maximum possible rate based on the relevant hardware components, based on a control configuration which smooths out input values over time or otherwise does not benefit from an increased frequency of input data, and still be considered "continuous."

In one embodiment, a conversion stage 126 may be added for the purpose of converting raw signals from one or more of the online sensors 122 to a signal compatible with the input requirements of a controller 132. For example, and as further described below, raw turbidity measurement signals may be received at the converter stage 126 and converted to 4-20 mA signals corresponding to the total suspended solids ("TSS") for a given sample or relevant portion of the online composition.

The online measurement data from the various sensors, and the input data from one or more users via the user interface, are provided to a processing and control stage 130, an embodiment of which is represented in FIG. 1 as including a controller 132. The controller 132 may be a "local" controller configured to directly receive the aforementioned signals and perform specified data processing and control functions, while separately corresponding with a remote or centrally located controller 150 via a communications network, wherein the centrally located controller 150 is configured to perform additional functions or coordinate control efforts in an administrative context across a plurality of production stages or the like. In an embodiment, the controller 132 may be configured to perform each of the otherwise distinguished local and distributed functions. In an embodiment, the respective local controllers 132 for each of a plurality of production operations or zones may comprise "distributed" controllers that are effective to take local control over specific operating and control functions, e.g., in the context of a communications failure or other defined alarm or status, whereas the central controller 134 maintains general monitoring and control over the various operations during steady state operating modes.

Terms such as "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of certain acts, functions and algorithms described herein. A general purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The steps of a method, process, or algorithm described in connection with the embodiments disclosed herein can be embodied directly in controller hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

In an embodiment, a controller 132 from the data processing and control stage 130 may be communicatively linked to a proprietary data server and/or data storage 160, such as for example a cloud-based historical database. The historical data server may for example be configured to obtain, process and aggregate/store data for the purpose of developing correlations over time, improving upon existing linear regressions or other relevant iterative algorithms, etc. The controller 132 may be configured to include certain correlations, equations and/or algorithms in a local data storage, while continuously or periodically transmitting relevant data to the historical server, and for example periodically retrieving any changes to the correlations, equations and/or algorithms as may be determined with the additional input data over time via, e.g., machine learning.

Figure 2:
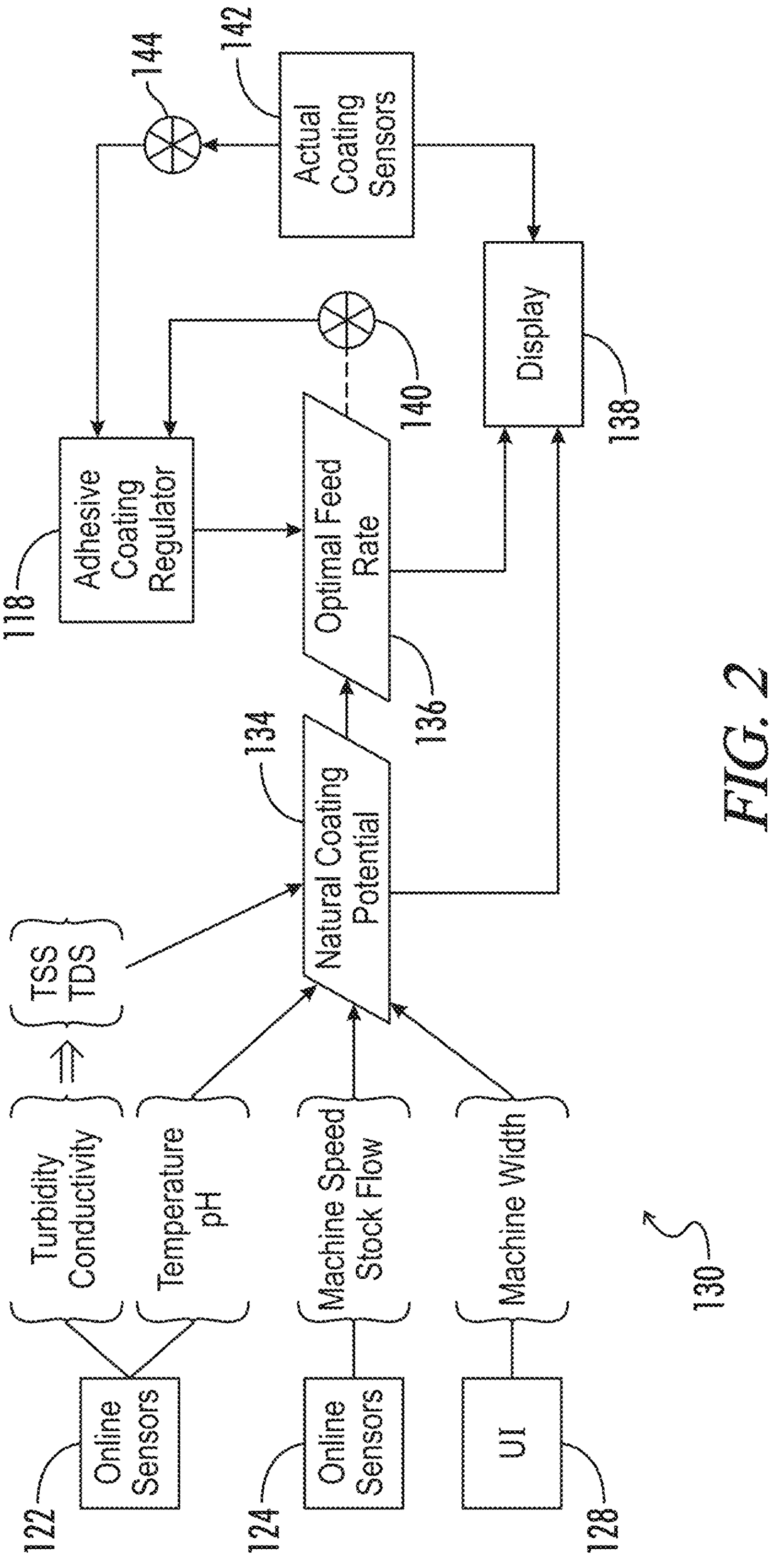
FIG. 2 is a flowchart representing an embodiment of a method as disclosed herein.

Referring now to FIG. 2, an embodiment may now be described for an exemplary method of regulating adhesive coating for a Yankee dryer in real time by predicting a natural coating potential, substantially in accordance with an embodiment of the system as disclosed above.

In the particular embodiment, one or more online sensors 122 are configured to provide measurements corresponding to stock/fibrous sheet characteristics comprising at least turbidity and conductivity. Conversion from the raw optical turbidity units to total suspended solids (TSS, mg/L) is linear and can be configured easily in the converter. Conversion from the raw conductivity measurements (as taken, e.g., in micro-siemens) to total dissolved solids (TDS, mg/L) is non-linear, and the manual determination of relationships according to conventional techniques requires a much longer test that involves evaporating water out of the sample. In one embodiment of the system as disclosed herein the converter, which may in various embodiments be linked to or alternatively integrated with the controller, may implement predetermined correlations to convert raw values from, e.g., the conductivity sensor with a TDS value in real time and without requiring the manual sampling process, based on calculated coefficients, historical stored and retrieved results, or relationships alternatively extrapolated therefrom. In a particular embodiment, certain coefficients or relationships to be implemented for the conversion of turbidity units to TSS, and/or the conversion of conductivity to TDS, may be provided or updated manually from operators via the user interface, e.g., in the context of a respective product or furnish change.

In an embodiment, pH sensors may further be provided, as the pH value influences key parameters affecting the Yankee dryer coating and the quality of the final sheet. For example one skilled in the art may appreciate that pH can impact wet end chemistries, drainage, charge and other conditions which in turn can affect post pressure roll consistency (dryness at the pressure roll nip) which will impact the Yankee dryer coating by increasing or decreasing the amount of rewetting caused by a wetter or a drier sheet adhering to the coating. pH and the impact on drainage can therefore be a critical factor in the coating performance and natural coating build up and subsequent adjustments necessary to maintain good crepe quality and softness.

In an embodiment, an additional one or more sensors may detect real time values for one or more variables (such as temperature), so as to better correlate raw input values for, e.g., conductivity with converted values (e.g., TDS) based on predetermined relationships which may include or otherwise be influenced by associated factors (such as temperature).

Using the online data, or converted values therefrom, and further accounting for the machine speed and stock flow (as obtained, e.g., from one or more online sensors) and the machine width (as obtained, e.g., from the operator interface), the controller may be configured to make predictions on how the Yankee dryer surface properties will change in accordance with changes in the fiber source for the stock, such as for example from virgin to recycle, and among various other types or ratios thereof. The controller in an embodiment first via step 134 calculates the potential for natural coating (NCP) on the Yankee dryer in accordance with the following exemplary equation:

$$\frac{(TSS+TDS)\text{mg}}{m^3} * \frac{(\text{Stock Flow})m^3}{\text{min}} * \frac{\text{min}}{(\text{machine speed})m} * \frac{1}{(\text{machine width})m} = NCP\frac{\text{mg}}{m^2}$$

The controller may then via step 136 determine optimal coating feed rates, knowing for example what source of fiber is being used, along with the grade being produced and the machine speed. In an embodiment, the controller may determine optimal settings for constituent components (e.g., individual chemical additives or combinations thereof having common effects) of the adhesive coating, such as for example adhesive aid components or release aid components. For example, where the coating application system may include a plurality of pumps associated with respective chemical additives for the synthetic coating mixture, the controller 132 may be configured to determine optimal settings or adjustments to one or more individual pumps or associated flow rates there through for the purpose of optimizing the total adhesive coating on the Yankee dryer surface. In an embodiment, the controller may alternatively determine optimal settings for a general adhesive feed rate, independent of distinctions between the constituent components.

The controller may generally be communicatively linked to a display unit 138, for example as may be positioned locally with respect to an operator control panel, remotely with respect to, e.g., a server-based and/or online dashboard, or both. The controller may programmatically generate displayed values corresponding to any or all of the sensed values, the converted values corresponding to the TSS and/or TDS, the natural coating potential (NCP) and the optimal Yankee dryer surface coating feed rate(s). In an embodiment, the system may be provided with a manual mode, in which one or more operators are authorized to implement any desired changes in the feed rate set points for the coating application system.

In an embodiment, the controller may further be provided with an automatic mode 140, wherein the optimal feed rate value(s) may be compared with respective actual values or detected feed rate values, and control signals generated based thereon. In one example, a forward (open loop) control operation is enabled to identify and automatically implement a corrective action for one or more machine operating parameters, via regulation of the associated working implements, e.g., pumps in the adhesive coating application system 118. The control operation may be proportional in nature, wherein the controller identifies a directional aspect of the desired correction in order to obtain (or drive the system towards) an optimal adhesive coating, and the control operation may in certain embodiments further include an integral and/or derivative aspect wherein the corrective steps account for a rate of change over time to substantially prevent overshooting.

The system may enable the operators to selectively switch control of the coating feed rate from automatic mode to manual mode, such that the operators may use their judgement to made adjustments to the recommendations provided. In some embodiments, the system may be configured to prompt or otherwise provide alarms to operators via the user interface to confirm that automatic mode is to be maintained. The system may provide such prompts or alarms in association with, e.g., predicted optimal values, corrective measures, or any other monitored trend in the operation that falls outside of defined thresholds for historical patterns.

In either of the manual or automatic operating modes, the controller 132 may generally be communicatively linked to the chemical pumps or local regulators or control actuators associated with the adhesive coating application system 118 for the purpose of implementing manual or automatic adjustments to particular feed rate settings. Such links, as well as communication links with respect to at least the various sensors, the user interface, the controllers, the historical data server, etc., may be provided via respective communications networks. The term "communications network" as used herein with respect to data communication between two or more system components or otherwise between communications network interfaces associated with two or more system components may refer to any one of, or a combination of any two or more of, telecommunications networks (whether wired, wireless, cellular or the like), a global network such as the Internet, local networks, network links, Internet Service Providers (ISP's), and intermediate communication interfaces. Any one or more recognized interface standards may be implemented therewith, including but not limited to Bluetooth, RF, Ethernet, and the like.

In an embodiment, a system 100 and control stage operation 130 as disclosed herein may include additional online measurement devices 142 for sensing actual adhesive coating characteristics with respect to the Yankee dryer surface. A feedback (closed loop) control 144 may further be implemented to account for one or more such characteristics, e.g., coating thickness, uniformity, composition, and the like.

Figure 3:
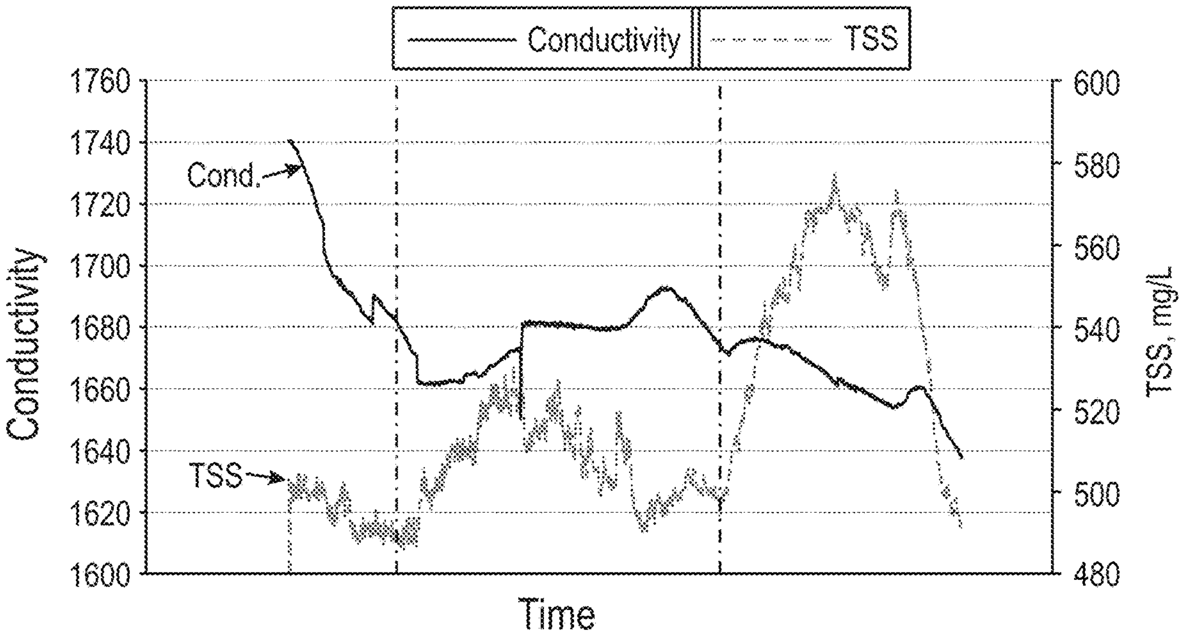
FIG. 3 is a graphical diagram representing test data collected from an exemplary tissue machine.
Figure 4:
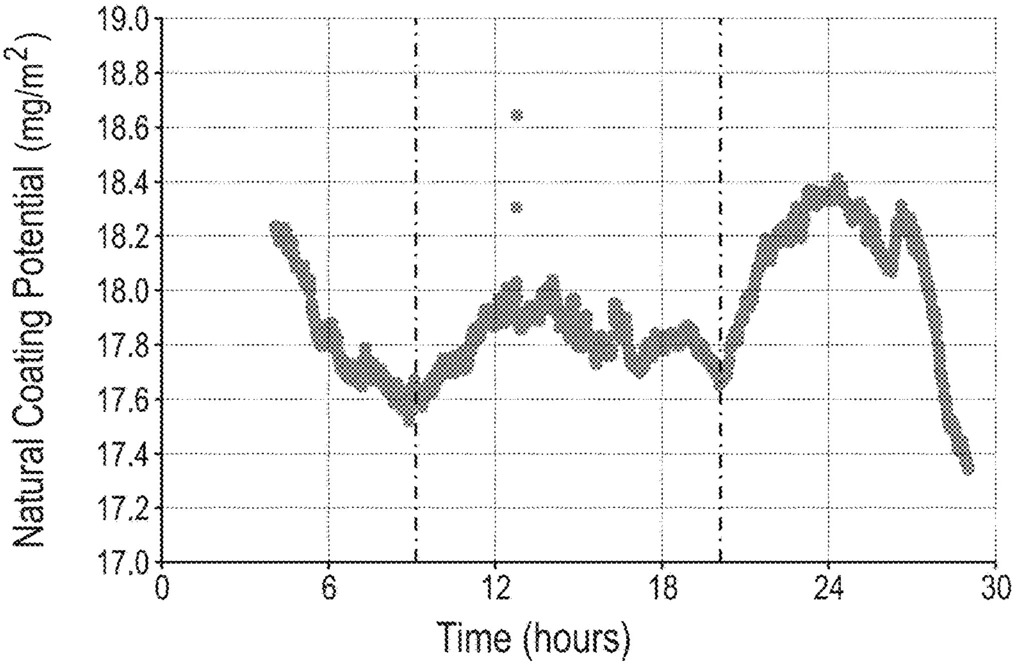
FIG. 4 is a graphical diagram representing calculations of a natural coating potential from the test data collected and represented in FIG. 3.
Figure 5:
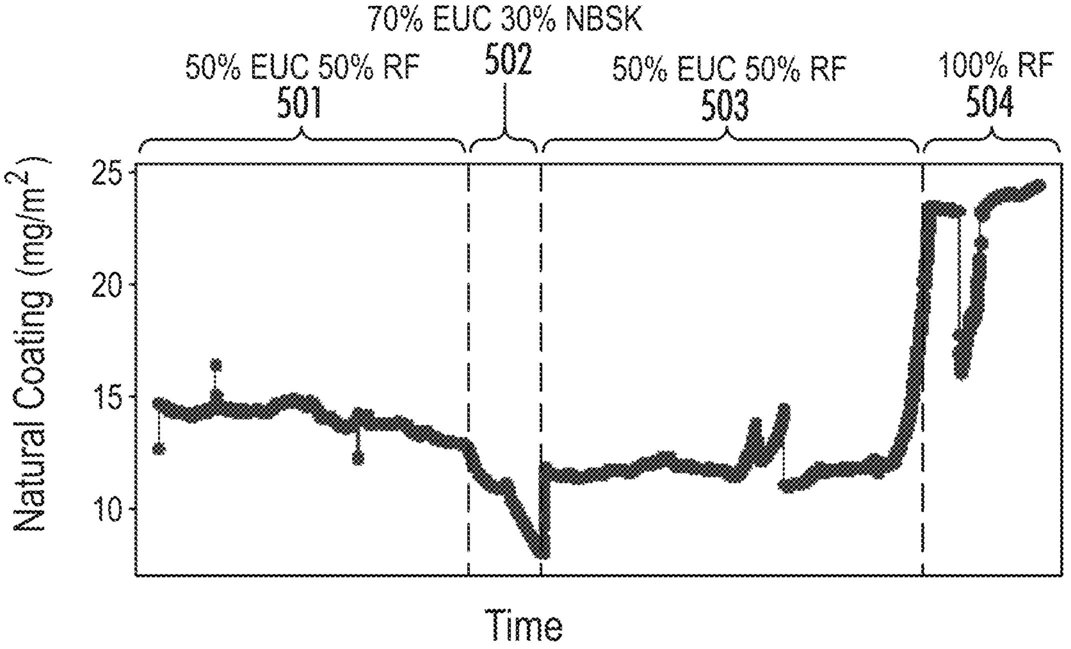
FIG. 5 is a graphical diagram representing variable levels of natural coating potential with respect to multiple types of exemplary fiber sources.

With reference now to FIGS. 3-5, further description may be provided to demonstrate the various relationships and effects. In a test operation from which the various graphically presented data points were derived, for example, it may be demonstrated that coating and release feed rates should have changed beyond their normal machine speed adjustments, and the benefits of real time monitoring and adjustment become readily apparent.

FIG. 3 illustrates collected data for conductivity and total suspended solids over a two days period with respect to an exemplary tissue machine. As one of skill in the art may appreciate from the represented data, the conductivity and TSS values can change very quickly on the machine. There is a 5-10 percent variation in conductivity in the example shown, and the total suspended solids in the measured stream varies by more than 15 percent. Both of these factors can in turn modify the chemistry in the system, and change sheet formation, retention, drainage and the properties of the Yankee dryer surface coating. As the fiber source is changed (e.g., from virgin to recycle, or changes in associated ratios thereof) in association with the illustrated dashed vertical lines, the amount of natural coating on the Yankee dryer surface is altered, as shown in the calculated values in FIG. 4, and accounting for real time inputs for machine speed and feed rate. Various embodiments of a system as disclosed herein therefore enable or facilitate adjustments to a level of adhesion aid or of release chemistry, as if the Yankee dryer coating is not adjusted as the machine conditions change, production can be affected (e.g., breaks) and the quality of the resulting creped product may be compromised as well.

Referring to FIG. 5, it may be seen how natural coating varies with different furnishes (fiber sources). In the example shown, the mill at different times uses *eucalyptus* (EUC), northern bleached softwood kraft (NBSK) and recycled fiber (RF), often in different ratios. The amount of natural coating on the Yankee dryer surface changes from one fiber source to another. Note also that conditions may continue to change well after a change in furnish is made, as for example is illustrated during the time period 502 with 70% EUC and 30% NBSK. The segments 501 and 503 labeled "50% EUC, 50% RF" represent two different time periods, but with similar results.

Accordingly, in an embodiment the controller 132 may be configured to identify a grade change being made on the machine (or projected to be made), wherein changes can be made in the synthetic coating chemistry in anticipation of the difference in natural coating. The controller 132 may, e.g., receive information from the operators via the user interface defining an upcoming furnish adjustment, wherein the controller further retrieves predetermined correlations, algorithms or historical data corresponding to the upcoming furnish composition and determines optimal values or adjustments to the set points for one or more components in the adhesive coating application system 118, further based at least in part on the actual (real time) values for some or all of the machine speed, feed rate, machine width, temperature, etc.

In such an event, the controller 132 may be configured to provide an initial predicted natural coating potential based on the furnish change alone, and to determine an initial but tentative optimal adhesive coating setting (or array of settings). The initial prediction and determinations may be described as "tentative" in that an otherwise aggressive control response setting may be dampened by the controller to account for the open-loop (feed-forward) nature of the predicted changes, whereas the controller may dynamically increase control response settings or recommendations as feedback is provided with respect to monitored changes in the turbidity and/or conductivity in the throw-off from a continuous sheet associated with the new furnish change. In various embodiments, the controller 132 may still further dynamically modify control response settings, and/or the correlations or algorithms driving future determined optimal values or adjustments, based on additional sensor feedback (in embodiments where such is available) regarding an actual composition, thickness and/or uniformity thereof with respect to the coating across the Yankee dryer surface.

Conditional language used herein, such as, among others, “can,” “might,” “may,” “e.g.,” and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A predictive method for regulating application of an adhesive coating to a Yankee dryer, as part of a manufacturing process for creped products comprising generating a continuous fibrous sheet from a stock and applying the fibrous sheet to a surface of the Yankee dryer, the method comprising:

continuously measuring, via one or more online sensors, a plurality of characteristics corresponding to wet end conditions of the stock;

continuously sensing actual machine control values comprising a stock flow rate and a machine speed;

predicting a natural coating potential of the fibrous sheet prior to the Yankee dryer, wherein the natural coating potential to be applied from the fibrous sheet to the surface of the Yankee dryer is predicted, substantially in real time, based at least in part on the measured characteristics and the sensed actual machine control values; and generating an output signal corresponding to the predicted natural coating potential.

2. The method of claim 1, further comprising determining an optimal adhesive coating feed rate for projection upon the surface of the Yankee dryer, based at least in part on the predicted natural coating potential, wherein the generated output signal corresponds to the optimal adhesive coating feed rate.

3. The method of claim 2, wherein the generated output signal is transmitted to a display unit, the method further comprising displaying the optimal adhesive coating feed rate on the display unit.

4. The method of claim 2, further comprising automatically controlling the adhesive coating feed rate based on a comparison of one or more determined optimal values associated with respective actual values.

5. The method of claim 4, wherein the stock comprises one or more fiber sources, the method further comprising identifying changes from a first group of one or more fiber sources to a second group of one or more fiber sources during the process, and predicting a natural coating potential to be applied from the second fiber source to a surface of the Yankee dryer, substantially in real time, based at least in part on predetermined correlations for the second group of one or more fiber sources.

6. The method of claim 5, wherein the first and second groups of one or more fiber sources comprise respective first and second ratios of the same one or more combined fiber sources having known or extrapolated collective correlations to the measured operating characteristics.

7. The method of claim 1, wherein the one or more online sensors comprise a turbidity sensor, a conductivity sensor and a pH sensor.

8. The method of claim 7, further comprising:

generating a value for total suspended solids associated with the stock flow based on predetermined correlations with at least a measured turbidity value, and generating a value for total dissolved solids associated with the stock flow based on predetermined correlations with at least a measured conductivity value, wherein the natural coating potential associated with the fibrous sheet is determined, substantially in real time, based at least in part on the generated values for total suspended solids and total dissolved solids.

9. A predictive method for regulating application of an adhesive coating to a Yankee dryer, as part of a manufacturing process for creped products comprising generating a continuous fibrous sheet from a stock and applying the fibrous sheet to a surface of the Yankee dryer, the method comprising:

continuously measuring, via one or more online sensors, a plurality of characteristics corresponding to wet end conditions of the stock;

continuously sensing actual machine control values comprising a stock flow rate and a machine speed;

predicting a natural coating potential of the fibrous sheet prior to the Yankee dryer, wherein the natural coating potential to be applied from the fibrous sheet to the surface of the Yankee dryer is predicted, substantially in real time, based at least in part on the measured characteristics and the sensed actual machine control values; and automatically controlling an adhesive coating feed rate based at least in part on the predicted natural coating potential.

10. The method of claim 9, further comprising:

identifying changes from a first group of one or more fiber sources to a second group of one or more fiber sources during the process; and predicting a natural coating potential to be applied from the second fiber source to a surface of the Yankee dryer, substantially in real time, based at least in part on predetermined correlations for the second group of one or more fiber sources.

11. The method of claim 9, further comprising determining an optimal adhesive coating feed rate for projection upon the surface of the Yankee dryer, based at least in part on the predicted natural coating potential, wherein the generated output signal corresponds to the optimal adhesive coating feed rate.

12. The method of claim 11, wherein the generated output signal is transmitted to a display unit, the method further comprising displaying on the display unit one or more of the optimal adhesive coating feed rate, the measured stock characteristics, and predicted natural coating potential.

13. The method of claim 9, wherein the one or more online sensors for continuously measuring characteristics corresponding to wet end conditions of the stock comprise a first set of one or more online sensors, the method further comprising:

measuring, via a second set of one or more online sensors proximate a surface of the Yankee dryer, one or more characteristics of a natural coating potential applied from the fibrous sheet to the surface of the Yankee dryer, and generating a feedback control signal based on the measured one or more actual coating characteristics.

14. The method of claim 1, wherein the one or more online sensors for continuously measuring characteristics corresponding to wet end conditions of the stock comprise a first set of one or more online sensors, the method further comprising:

measuring, via a second set of one or more online sensors proximate a surface of the Yankee dryer, one or more characteristics of a natural coating potential applied from the fibrous sheet to the surface of the Yankee dryer, and generating a feedback control signal based on the measured one or more actual coating characteristics.

* * * * *